United States Patent [19]
Teraoka

[11] 3,850,257
[45] Nov. 26, 1974

[54] SYSTEM FOR PREVENTION OF ERRORS IN SCALE MEASUREMENT DUE TO TEMPERATURE VARIATIONS

[76] Inventor: Takeharu Teraoka, No. 24-25, Kugahara 6-chome, Oota-ku, Tokyo, Japan

[22] Filed: Nov. 7, 1973

[21] Appl. No.: 413,493

[30] Foreign Application Priority Data
Nov. 15, 1972 Japan.............................. 47-114934
Nov. 30, 1972 Japan.............................. 47-120103

[52] U.S. Cl. .............................................. 177/226
[51] Int. Cl............................................. G01g 3/18

[58] Field of Search..................... 177/226, 227, 228

[56] References Cited
UNITED STATES PATENTS
1,255,351 2/1918 Templeton......................... 177/226
1,890,569 12/1932 Burkheiser......................... 177/226

Primary Examiner—George H. Miller, Jr.
Attorney, Agent, or Firm—McGlew and Tuttle

[57] ABSTRACT

An improved seal designed and dimensioned such that changes in dimensions due to temperature variations balance out such that the indicator is insensitive to temperature variations.

13 Claims, 4 Drawing Figures

SYSTEM FOR PREVENTION OF ERRORS IN SCALE MEASUREMENT DUE TO TEMPERATURE VARIATIONS

DESCRIPTION OF INVENTION

The present invention relates to an improved scale system insensitive to temperature variations, and, in particular, to a scale in which errors of zero level and graduations of the scale due to temperature variations have been eliminated.

A scale is so made and assembled as to function properly at a given temperature. Thus if and when the scale is used for weight measurement at the same temperature as when it is made and assembled, it functions properly. What matters, however, is the fact that scales are almost always used at a different temperature from when they are made and assembled.

As a result of temperature variations, therefore, such scale members as a lever, a code plate, a spring and a spring support constituting the frame and mechanism are quite likely to undergo changes in length and elasticity, causing errors in weight measurement.

Accordingly this invention relates to the elimination of such errors in measurement, and, particularly, to the system for preventing errors in scale measurement due to temperature variations characterized in that the scale is so made and assembled as to function properly by balancing the changes in length and elasticity of each member.

One of the main reasons behind the errors in scale measurement due to temperature variations is a change of the zero level caused by temperature variations.

Almost always when the zero level of the code plate set to move along with the rocking movement of the lever does not correspond in the no-load state to the base point of the weight reading member set opposite to said code plate, some errors will be made in measurement because of the change of the zero level.

In the scale, such members as the lever, the code plate, the spring support constituting the frame and the mechanism expand or contract due to temperature variations, and so if the scale is made and assembled by adjusting the zero level of said code plate to the base point of said reading member, the temperature variations leave a gap between said level and said point owing to the form, structure and quality of said members. In these circumstances, the weight measurement inaccurate because of the gap.

Thus, the present invention relates to the prevention of errors in scale measurement characterized in that a spring supporting member is so assembled as to balance the expansion and contraction of scale members which bring about upward and downward changes of the zero level of said code plate and the base point of said reading member through the temperature variations.

According to this invention, the scale can be used at any temperature without the change of the zero level, thereby enabling accurate weight measurement. Furthermore, the balance in expansion and contraction of the scale members can be maintained by accurately defining the quality and length of said spring supporting member.

In the meanwhile, the other reason behind the errors in scale measurement due to temperature variations is a change of graduations due to temperature variations.

Up to the present, invariable steel has been used as spring member for the purpose of preventing errors in scale measurement due to temperature variations. In this conventional system of using invariable steel, the steel or the material having the constant temperature coefficient to elasticity is used for excluding changes in elasticity of the spring member due to temperature variations.

However, not only the spring member but also a weight indicating mechanism (a rack and said code plate, for example) connected with the action point of said lever are affected by the temperature variations. In other words, when said code plate is used in said indicating mechanism, the code plate expands by ($L_1$-L) from the actual length (L) due to a rise in temperature. In this case, an error equivalent to said ($L_1$-L) will be made in graduations even if invariable steel having constant elasticity is used.

Although these kinds of errors have been considered permissible so far, the present-day needs call for their prevention for further improvement of accuracy in scale measurement.

Thus, in this invention, a pair of spring members having different coefficient of elasticity from each other are hooked on the position of the dynamic point of the scale mechanism so as to follow the movement of the weight indicating member caused by the temperature variations. That is, the present invention aims to provide a highly-accurate scale mechanism which shows no error in graduations due to temperature variations. Besides, as compared with the conventional systems wherein invariable steel, hard to get and expensive, is used as indicating member or wherein one spring member showing changes in elasticity due to temperature variations is used, the scale mechanism of this invntion can be prepared at a moderate price and its spring member can be designed quite simply and properly even when applied to the mechanism having different leverages.

The embodiments of the present invention are explained here according to the drawings.

Figure 1:
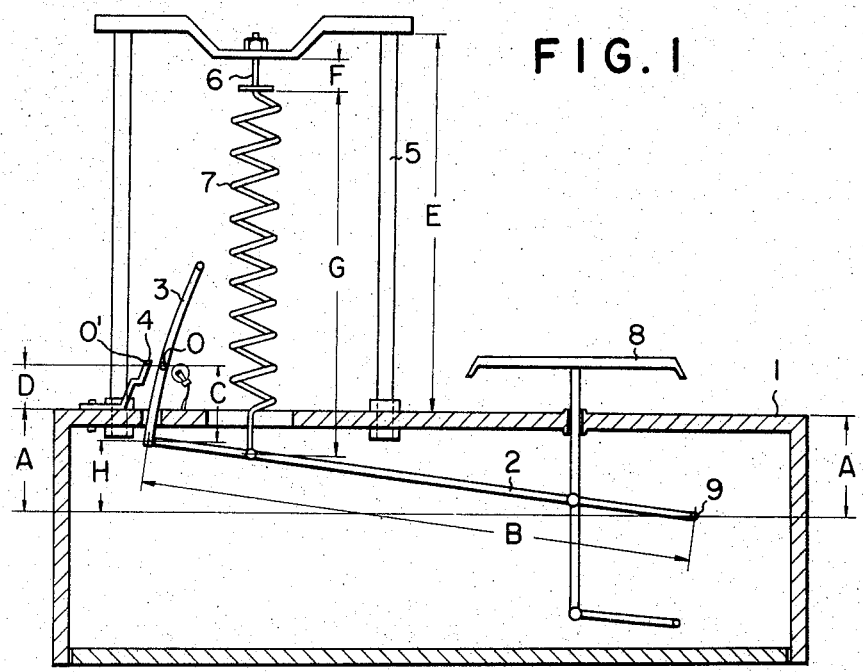
FIG. 1 is a side sectional view of the improved scale in which errors for the zero level have been eliminated.

In FIG. 1, the scale mechanism comprises the frame (1), the lever (2), the code plate (3), the weight reading member (4), the spring support (5), the spring hanging arm (6), the spring (7), etc. When an object that is to weighed is placed on the scale plate (8), the lever (2) swings downward with (9) as fulcrum to move the code plate (3) downward. As a result, the relative position of the code plate (3) and the reading member (4) indicates the weight of the object.

In FIG. 1, (0) and (0′) designate the zero level (0) of the code plate (3)° and the base point (0′) of the reading member (4) respectively and both (0) and (0′) correspond exactly to each other in the no-load state.

In this type structure, factors to cause upward and downward displacements of the zero level (0) through temperature variations will be described as follows; (In checking the expansion of each member due to temperature variations, the linear expansion coefficients of the members (1) (2) . . . (7) are designated as (a) (b) . . . (g) while the risen temperature above the scale's construction is designated as T.)

(1) Factors to cause upward displacement (+)
I. Displacement of upper-surface position of frame (1):

$$\Delta A = A \cdot a \cdot T$$

where
A. shows the distance between the fulcrum (9) and the upper-surface of the frame (1).

II. Displacement due to expansion of lever:

$$\alpha H = \Delta B \cdot H/B$$

where
B. shows the length of the lever (2) while (H) showing the distance between the top-end of the lever (2) and the fulcrum (9).

As ($\Delta B = Bbt$) shows the expansion of the lever (2), $$\alpha H = B \cdot b \cdot T \cdot H/B = H \cdot b \cdot T$$

III. Displacement due to expansion of code plate (3):

$$\Delta C = C \cdot c \cdot T$$

where
C. shows the length of the code plate (3) ranging from the lever (2) to the zero level (0).

IV. Displacement due to expansion of spring support (5):

$$\Delta E = E \cdot e \cdot t$$

where
E. shows the length of the support (5).

2. Factors to cause downward displacement (−)
V. Displacement due to expansion of spring hanging arm (6):

$$\Delta F = F \cdot f \cdot T$$

where
F. shows the length of the spring hanging arm (6).

VI. Displacement due to expansion of spring (7):

$$\Delta G = G \cdot g \cdot T$$

where where (G) shows the length of the spring (7)

Factors to cause upward and downward displacements of the base point (0') through temperature variations will be described as follows;

1. Factors to cause upward displacement (+)
VII. Displacement of upper-surface position of frame (1):

$$\Delta A = A \cdot a \cdot T$$

VIII. Displacement due to expansion of reading member (4):

$$\Delta D = D \cdot d \cdot T$$

where
D. shows the distance between the lower end of the reading member (4) and the base point (0').

2. There exists no factor to cause downward displacement

Therefore, what is needed to balance the zero level (0) and the base point (0') through temperature variations is to keep equal their displacements. That is, $$\Delta A + \Delta H + \Delta C + \Delta E + (-\Delta F) + (-\Delta G) = \Delta A + \Delta D$$

Therefore $$\Delta H + \Delta C + \Delta E - \Delta F - \Delta G = \Delta D$$

$$\Delta E = \Delta D + \Delta F + \Delta G - \Delta H - \Delta C$$

$$E \cdot e = D \cdot d + F \cdot f + G \cdot g - H \cdot h - C \cdot c$$

In order to balance the zero level (0) and the base point (0'), what is needed is to define the length (E) of the spring support (5) and the linear expansion coefficient (e) in accordance with these equations after determining the dimensions and quality of the members (1) (2) (3) (4) (5) (6) (7).

Thus the zero level (0) of the code plate (3) and the base point (0') of the reading member (4) can be balanced through temperature variations by carefully defining the quality and length (E) of the spring support (5).

Figure 2:
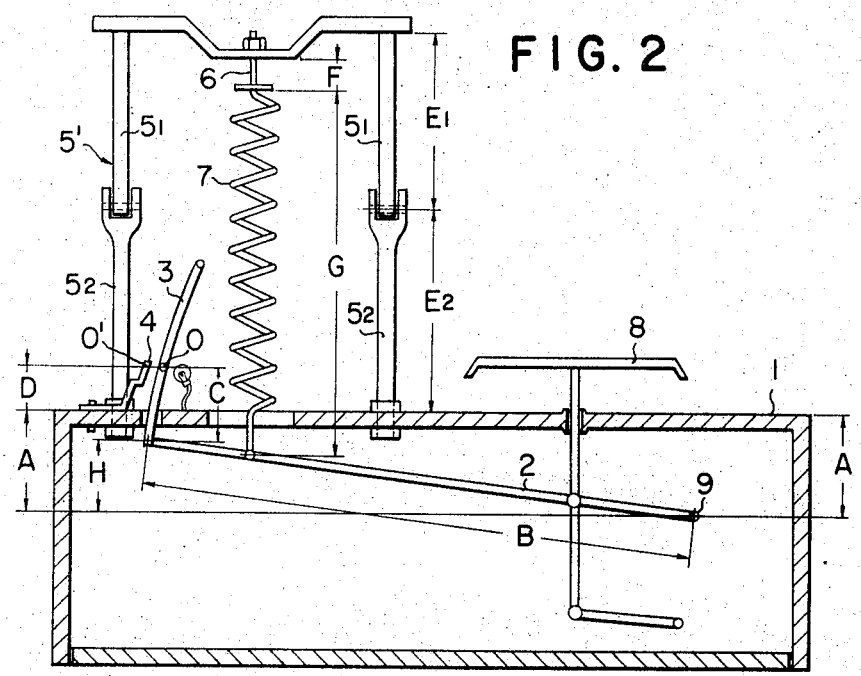
FIG. 2 is a side sectional view of the scale showing another embodiment of the said system.

As shown in FIG. 2, a pair of spring supports ($5_1$ and $5_2$) having different linear expansion coefficients are connected with the base point (0') and can be balanced by defining the quality and length of the supports ($5_1$ and $5_2$).

One of the embodiments shows that the Invar support having linear expansion coefficient of $12 \times 10^{-6}$ enables the balancing of both positions (0 and 0') and that iron supports connected with the Invar support also enable the balancing.

Figure 3:
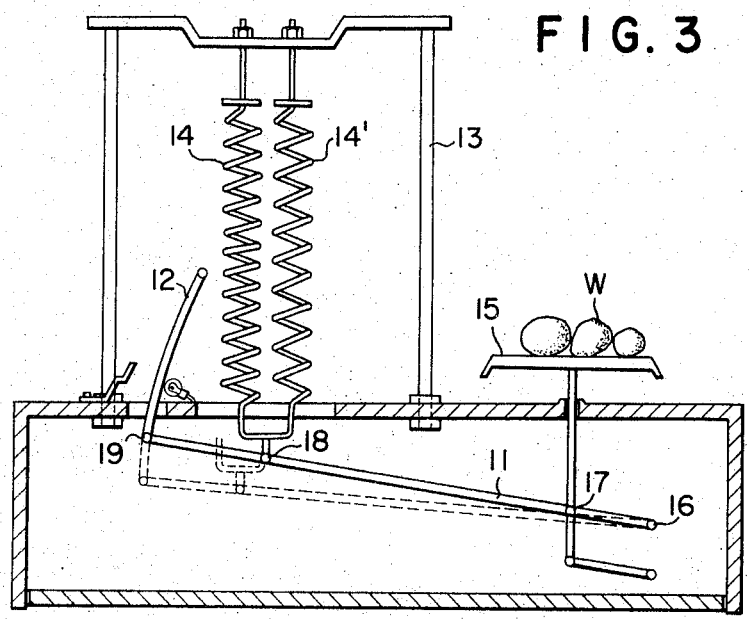
FIG. 3 is a side sectional view of the improved scale in which errors for graduations have been eliminated.
Figure 4:
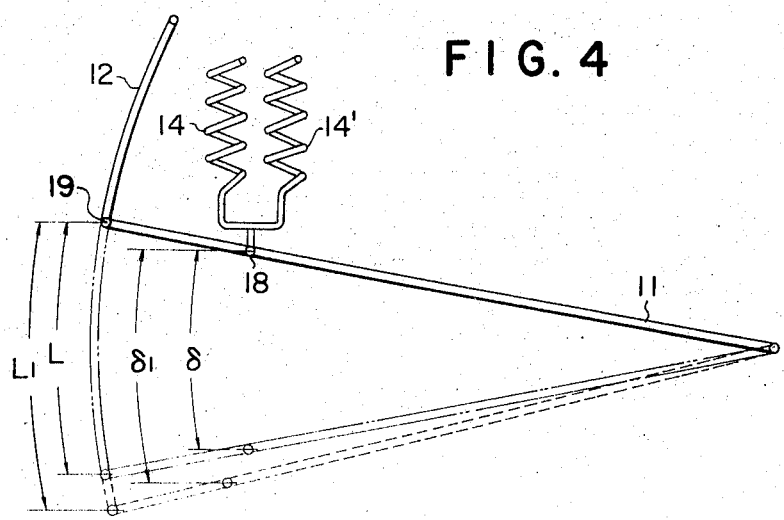
FIG. 4 is an enlarged schematic view of the essential parts in FIG. 3.

In FIG. 3 a mechanical view of the scale showing the preventive system of errors in graduations, the scale mechanism comprises a lever (11), a code plate (weight indicating member) (12), a spring support (13), a spring member consisting of a main spring (14) and a supplementary spring (14') constituting a pair of springs. In the same figure, (16) (17) (18) and (19) designate the fulcrum, the weight point, the dynamic point and the action point respectively.

Here for example invariable steel or Elcoloy (trademark) metal temperature coefficient for elasticity is zero) is used for the main spring (14) and the carbonate steel or piano wire whose temperature coefficient for elasticity is $-25.2 \times 10^{-5}$) for the supplementary spring (14').

When an object (W) is placed on the scale plate (15), the load on the springs (14 and 14') which is designated as P is not affected by temperature variations.

The load over the main spring (14) is designated as $P_E$ while that over the supplementary spring (14') as $P_P$. At a normal temperature, the stroke of both springs (14 and 14') is designated as $S_1$ while their rigidity as $G_E$ and $G_p$ respectively. When the temperature rises, the stroke of both springs (14 and 14') are designated as $\sigma$ while the rigidity of the supplementary spring is $G_{P1}$ ($G_E$ is constant). The proportional constants of the springs (14 and 14') are $K_E$ and $K_P$, respectively; and the loads over the main spring (14) and the supplementary spring (14') are $P_{E1}$ and $P_{P1}$. The condition that the load be the same regardless of temperature is:

$$P = PE + P$$

$$= P E_1 + P_{p1}$$

But,
$$P_E = K_E \cdot G_E \cdot \delta, \quad P_p = K_p \cdot G_p \cdot \delta$$
$$P_{E1} = K_E \cdot G_E \cdot \delta_1, \quad P_{p1} = K_p \cdot G_{p1} \cdot \delta_1$$
Consequently,
$$K_E \cdot G_E \cdot \delta + K_p \cdot G_p \cdot \delta = K_E \cdot G_E \cdot \delta_1 + K_p \cdot G_{p1} \cdot \delta_1$$
$$K_E \cdot G_E(\delta - \delta_1) = K_p(G_{p1} \cdot \delta_1 - G_p \cdot \delta)$$
$$(K_E/K_p) = [G_{p1} \cdot \delta_1 - G_p \cdot \delta / G_E (\delta - \delta_1)]$$

Equation i.

And,
$$K_E = d_E^4 / 8n_E \cdot D_E^3, \quad K_p = dp^4/8np \cdot Dp^3$$

where $d$ designates the linear diameter of the spring while $n$ the efficient winding number of the spring and $D$ the winding diameter of the spring.
Therefore,
$$KE/Kp = (Dp^3 \cdot dE^4/DE^3 \cdot dp^4) \cdot np/nE = (np/nE) \cdot R$$

Equation ii.

However, $R = Dp^3 \cdot de^4/DE^3 \cdot dp^4$ is constant whenever the same spring is used.

The strokes $\delta$ and $\delta_1$ of the springs (14 and 14') which must apply to changes in temperature of the code plate (12) can proportionately be determined from L and L$_1$ the said plate (12) in accordance with the leverage that is, the relations of position between the dynamic point (18) and the action point (19).

Therefore, the ratio of the efficient winding ratio of the main spring (14) to that for the supplementary spring (14') can be calculated from the equations (i and ii) by measuring the displacements L, L$_1$ of said code plate (12) due to temperature variations.

The winding number of one spring can be determined by defining the other's.

In the equation (i), $$Gp_1 = G p(1 + \alpha T) \quad (\alpha \text{ and } T \text{ designate the temperature coefficient to rigidity and the increment in temperature respectively.})$$

Consequently
$$KE/Kp = [Gp(1+\alpha T)] \cdot \delta_1 - Gp \cdot \delta / GE(\delta - \delta_1) = Gp[(1+\delta T) \cdot \delta_1 - \delta]/GE(\delta - \delta_1)$$

Equation iii.

From this equation (iii),
$$Kp = GE(\delta - \delta_1)/Gp[(1+\delta T)\cdot \delta_1 - \delta] \times KE$$

In multiplying by
$$\delta Gpkp = GE(\delta - \delta_1)/Gp[(1+\alpha T)\cdot \delta_1 - \delta] \times kE \cdot \delta Gp$$

Because $\delta Gpkp$ equals $Pp$,
$$Pp = \delta GEkE(\delta - \delta_1)/(1+\alpha T) \cdot \delta_1 - \delta$$

Because $\delta GEkE$ equals $P_E$,
$$Pp = PE(\delta - \delta_1)/(1+\alpha T) \cdot \delta_1 - \delta$$

Equation iv.

Thus the division of load between the main spring (14) and the supplementary spring (14') can be calculated.

Even when the said leverage of the scale mechanism is changed, the new relation of both springs (14 and 14') can be easily determined from the equation (ii) or (iv) if the same code plate (12) is used.

In this description, the rigidity $(G_E)$ of the main spring (14) is kept constant for simplicity by using invariable steel. Needless to say, however, a spring member having rigidity changeable through temperature variations can be used as the supplementary spring.

What we claim is:

1. In a scale having parts with linear dimensions and coefficients of expansion comprising a frame having a top with guide means; a weighing table having a supporting arm; slidably mounted for up and down movement through said guide means; a lever pivoted at its one end and pivotably connected intermediate its length to the said arm; at least one spring having a linear coefficient of expansion $(g)$ and a length $(G)$ from one end to an opposite second end, said one end of said spring being connected to said lever between said arm and the other end of the lever opposite to the pivoted end of said lever; a support mounted on the frame for suspending the spring, said support having an upright member of length $(E)$ and a linear coefficient of expansion $(e)$ and a top supported on said upright member having a spring arm connected to said spring at the end extending away from said lever of length $(F)$ and a linear coefficient of expansion $(f)$; a code plate having graduations thereon at spaced intervals including an intermediate zero graduation, having a linear coefficient of expansion $(c)$, one end of the code plate being fastened to the end of said lever opposite to the pivoted end of the lever and having a length $(C)$ located between the end of the code plate fastened to the lever and the zero graduation on the code plate; a reading member mounted on the frame and alignable with the code plate for reading the graduations thereon, the reading member having a linear coefficient of expansion $(d)$ and a vertical height $(D)$ extending from part of the frame at which the reading member is mounted to the zero point of alignment of the reading member with the code plate, the lever having a linear coefficient of expansion $(h)$ and vertical distance $(H)$ being the height measured between the end of the lever to which the code plate is fastened and the point at which the other end of the lever is pivoted, the improvement wherein said parts of the scale have the linear dimensions and coefficients of expansion defined according to the relation $$E \cdot e = D \cdot d + F \cdot f + G \cdot g - H \cdot h - C \cdot c,$$

whereby errors in weighing are eliminated due to variation of the zero position alignment of the code plate with the reading member of the scale due to changes in temperature.

2. The improved scale according to claim 1, wherein said support mounted on the frame for suspending the spring comprises an upright member including at least two parts having linear coefficients of expansion, $e_1, e_2, e_n$ and lengths $E_1, E_2 \ldots E_n$, the relationship between linear dimensions and coefficients of expansion of the scale being $E_1 \cdot e_1 + E_2 \cdot e_2 + \ldots E_n \cdot e_n = D \cdot d + F \cdot f + G \cdot g - H \cdot h - C \cdot c$ where $n$ is a positive integer not zero.

3. The improved scale according to claim 2, where $n$ is 2.

4. The improved scale according to claim 2, wherein $n$ is 2 and $e_1$ is the linear coefficient of expansion of Invar steel, while $e_2$ is the linear coefficient of expansion of iron.

5. The improved scale according to claim 1, wherein two springs are connected to the lever and suspended from the support, the linear coefficient of expansion of one spring being substantially zero, and the linear coefficient of expansion of the other spring being g, the term G·g referring only to said other spring.

6. The improved scale according to claim 5, wherein one spring ($E$) is of a different material from the other spring ($P$) and each spring is suspended from a spring connected to the support, where the efficient winding number of the one spring, $_E$, is determined by the relationship $$K_E/K_P = n_P/n_E \cdot R$$

where $$R = D_P^3/D_E^3 \ d_E^4/d_p^4$$

where $d_E$ and $d_p$ designates the linear diameters of each spring, $D_E$ and $D_P$ the winding diameter of each spring, and where $K_E$ and $K_P$ designate each of the proportionality constants of the springs, whereby errors in the indicated weight on the scale of an object due to temperature variations are eliminated.

7. A scale as described in claim 6, wherein one spring is composed of Invar steel and the other composed of carbonate steel.

8. A scale as described in claim 6, wherein one spring is composed of Elcoloy metal and the other spring is composed of piano wire.

9. A scale as described in claim 6, wherein one spring is composed of Invar steel and the other is some other material.

10. In a scale having parts with linear dimensions and coefficients of expansion comprising a frame having a top with guide means; a weighing table having a supporting arm; slidably mounted for up and down movement through said guide means; a lever pivoted at its one end and pivotally connected intermediate its length to the said arm; a first spring and a second spring each having one end connected to said lever between said arm and the other end of the lever opposite to the pivoted end of said lever; a support mounted on the frame for suspending the said first and second springs, said support having an upright member and a top supported on said upright member having a spring arm connected to each of said springs at the end extending away from said lever; a code plate having graduations thereon at spaced intervals including an intermediate zero graduation, one end of the code plate being fastened to the end of said lever opposite to the pivoted end of the lever; a reading member mounted on the frame and alignable with the code plate for reading the graduations thereon, the improvement wherein the first spring ($E$) is of different material from the second spring ($P$) and each spring is suspended from a spring connected to the support, where the efficient winding number of the first spring $E$ is determined by the relationship $$K_E/K_P = nP/nE \cdot R$$

where $$R = D_P^3 \ d_E^4/D_E^3 \ d_P^4$$

where $d_E$ and $D_p$ designate the linear diameters of each spring, $D_E$ and $D_P$ the winding diameter of each spring, and where $K_E$ and $K_P$ designate each of the proportionality constants of the springs, whereby errors in the indicated weight on the scale of an object due to temperature variations are eliminateed.

11. A scale as claimed in claim 10, wherein one spring is composed of Invar steel and the other spring is composed of carbonate steel.

12. A scale as claimed in claim 10, wherein one spring is composed of Elcoloy metal and the other spring is composed of piano wire.

13. A scale as claimed in claim 10, wherein one spring is composed of Invar steel and the other spring is composed of another material.

* * * * *